US006592964B2

(12) United States Patent
Ahn et al.

(10) Patent No.: US 6,592,964 B2
(45) Date of Patent: Jul. 15, 2003

(54) NOZZLE PLATE ASSEMBLY OF MICRO-INJECTING DEVICE AND METHOD FOR MANUFACTURING THE SAME

(75) Inventors: Byung-sun Ahn, Suwon (KR); Dunaev Boris Nikolaevich, Moscow (RU); Smirnova Valentina Konstantinovna, Moscow (RU)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/021,010

(22) Filed: Dec. 19, 2001

(65) Prior Publication Data

US 2002/0086136 A1 Jul. 4, 2002

Related U.S. Application Data

(62) Division of application No. 09/432,461, filed on Nov. 2, 1999, now Pat. No. 6,402,921.

(30) Foreign Application Priority Data

Nov. 3, 1998 (RU) .......................................... 98119954

(51) Int. Cl.[7] ............................ B32B 3/24; B32B 2/135

(52) U.S. Cl. ....................... 428/131; 428/220; 428/141; 428/137; 428/138; 428/332; 205/80; 347/44; 347/45; 347/46; 347/47

(58) Field of Search ................................ 428/131, 220, 428/141, 137, 138, 332; 205/80; 347/44, 45, 46, 47

(56) References Cited

U.S. PATENT DOCUMENTS

| | | | | | |
|---|---|---|---|---|---|
| 4,490,728 | A | | 12/1984 | Vaught et al. | |
| 4,801,955 | A | | 1/1989 | Miura et al. | |
| 4,809,428 | A | | 3/1989 | Aden et al. | |
| 5,140,345 | A | | 8/1992 | Komuro | |
| 5,255,017 | A | | 10/1993 | Lam | |
| 5,274,400 | A | | 12/1993 | Johnson et al. | |
| 5,378,504 | A | | 1/1995 | Bayard et al. | |
| 5,420,627 | A | | 5/1995 | Keefe et al. | |
| 5,435,896 | A | | 7/1995 | Hardee et al. | |
| 5,560,837 | A | | 10/1996 | Trueba | |
| 5,563,640 | A | | 10/1996 | Suzuki | |
| 5,855,713 | A | * | 1/1999 | Harvey | 156/153 |
| 5,859,655 | A | | 1/1999 | Gelorme et al. | |
| 6,054,011 | A | | 4/2000 | Radke et al. | |
| 6,083,411 | A | * | 7/2000 | Nakayama et al. | 216/27 |

OTHER PUBLICATIONS

Slewell, et al. *The ThinkJet Orifice Plate: A Part With Many Functions*, Hewlett–Packard Journal, May 1985, pp. 33–37.

* cited by examiner

*Primary Examiner*—William P. Watkins, III
(74) *Attorney, Agent, or Firm*—Robert E. Bushnell, Esq.

(57) ABSTRACT

A nozzle plate assembly of micro-injecting device and a method for manufacturing the same in which a master plate which defines a nozzle region is dipped into an electrolyte in which $NiH_2/SO_3/H$, $NiCl_2$, $H_3BO_3$, $C_{12}H_{25}SO_4/NaS$ and deionized water are mixed in a predetermined ratio. Then, current having a predetermined density is applied several times, to thereby form a nozzle plate having a plurality of nozzles. The nozzle plate so formed has different roughnesses at inner and outer surfaces, to thereby eliminate ink-crosstalk and the generation of air bubbles in the ink feed channel.

24 Claims, 5 Drawing Sheets

NOZZLE PLATE ASSEMBLY OF MICRO-INJECTING DEVICE AND METHOD FOR MANUFACTURING THE SAME

CROSS REFERENCE TO RELATED APPLICATION

This Application is a divisional application of U.S. application Ser. No. 09/432,461 (now U.S. Pat. No. 6,402,921 B1), filed on Nov. 2, 1999 and issued on Jun. 11, 2002, incorporated herein by reference. This application also makes reference to, incorporates the same herein, and claims all benefits and priority under 35 U.S.C. §120 of the aforementioned U.S. application Ser. No. 09/432,461 (now U.S. Pat. No. 6,402,921 B1), filed on Nov. 2, 1999 and issued on Jun. 11, 2002.

CLAIM OF PRIORITY

This application makes reference to, incorporates the same herein, and claims all benefits accruing under 35 U.S.C. §119 from an application for NOZZLE PLATE ASSEMBLY OF MICRO-INJECTING DEVICE AND METHOD FOR MANUFACTURING THE SAME earlier filed in the Russian Federation Patent Office on Nov. 3, 1998 and there duly assigned Ser. No. 98119954.

BACKGROUND OF THE INVENTION

1. Field of the Invention

The present invention relates to the field of micro-injecting devices and ink-jet printheads, and particularly to a nozzle plate assembly of a micro-injecting device.

2. Description of the Related Art

Generally, a micro-injecting device refers to a device which is designed to provide printing paper, a human body, or a motor vehicle with a certain amount of liquid, for example, ink, an injection liquid, or petroleum, using the method in which a predetermined amount of electric or thermal energy is applied to the above-mentioned liquid to bring about a volumetric transformation of the liquid. Thus, a predetermined amount of such a liquid can be supplied to a specific object.

Recent developments in electrical and electronic technology have enabled rapid development of such micro-injecting devices. Thus, micro-injecting devices are being widely used in daily life. An example of micro-injecting devices in daily use is the inkjet printer.

The inkjet printer is a form of micro-injecting device which differs from conventional dot printers in the capability of performing print jobs in various colors by using cartridges. Additional advantages of inkjet printers over dot printers are lower noise and enhanced quality of printing. For by these reasons, inkjet printers are gaining immensely in popularity.

An inkjet printer is generally provided with a printhead which transforms ink which is in the liquid state to a bubble state by turning on or off an electric signal applied from an external device. Then, the ink so bubbled is expanded and expelled so as to perform a print job on a printing paper.

Examples of the construction and operation of several ink jet print heads of the conventional art are seen in the following U.S. Patents. U.S. Pat. No. 4,490,728, to Vaught et al., entitled Thermal Ink Jet Printer, describes a basic print head. U.S. Pat. No. 4,809,428, to Aden et al., entitled Thin Film Device For An Ink Jet Printhead and Process For Manufacturing Same and U.S. Pat. No. 5,140,345, to Komuro, entitled Method Of Manufacturing a Substrate For A Liquid Jet Recording Head And Substrate Manufactured By The Method, describe manufacturing methods for ink-jet printheads. U.S. Pat. No. 5,274,400, to Johnson et al., entitled Ink Path Geometry For High Temperature Operation Of Ink-Jet Printheads, describes altering the dimensions of the inkjet feed channel to provide fluidic drag. U.S. Pat. No. 5,420,627, to Keefe et al, entitled Ink Jet Printhead, shows a particular printhead design.

In general, such a conventional inkjet printhead includes a nozzle plate having a nozzle with a minute diameter for ejecting ink. During ejection, the nozzle plate serves as a jet gate for finally ejecting ink onto external printing paper, and thus functions as an extremely important component in determining printing quality. Therefore, the substances used in forming a nozzle plate, and the size and shape of the nozzle must be designed in consideration of the characteristics of the ink.

Generally, in such an inkjet printhead, an outer surface of a nozzle plate is formed smooth so as to have low roughness. Thus, the surface tension between the nozzle plate and ink increases and the contact angle between them becomes larger, thereby preventing crosstalk in which ink droplets which are bubbled and ready to be discharged flow to an adjacent nozzle.

With the outer surface of nozzle plate, the crosstalk problem can be easily rectified by decreasing the surface roughness. However, if an inner surface of nozzle plate decreases in roughness, the surface tension between the inner surface and ink increases. Thus, the contact angle between the nozzle plate and ink becomes larger. As a result, ink which is to be discharged toward a nozzle coheres at an inner surface of the nozzle plate instead of being bubbled. In this case, the cohered ink droplets cut off between an ink feed channel and ink chamber, thereby disturbing the smooth supply of ink.

If the ink supply is not smooth and thus the ink contained in an ink chamber is insufficient, when a high speed driving of a printhead is performed, a large amount of air bubbles is generated in the ink chamber. Then, the generated air bubbles prevent ink droplets from passing through the nozzle, thereby causing a problem in that the ink cannot be ejected onto printing paper. As a result, overall printing quality is significantly lowered.

To overcome such problems, U.S. Pat. No. 5,563,640, to Suzuki, entitled Droplet Ejecting Device, has disclosed a method in which an outer surface of a nozzle plate is formed of substances having poor adhesiveness to ink, for example, polysulfone, polyethersulfone, or polyimide. Meanwhile an inner surface of the nozzle plate is coated by substances having excellent adhesiveness to ink, for example, $SiO_2$ film. Thus, different surface tensions can be maintained where the ink contacts the outer surface and the inner surface, thereby overcoming the above-described crosstalk and air bubble generation problems.

In addition, U.S. Pat. No. 5,378,504, to Bayard et al., entitled Method For Modifying Phase Change Ink Jet Printing Heads To Prevent Degradation Of Ink Contact Angles, has disclosed a method in which an additional coating substance having high durability is deposited onto an outer surface of a nozzle plate so as to prevent loss of surface tension and to maintain the state of the outer surface of the nozzle plate.

However, to form a nozzle on a nozzle plate, a complicated process using high cost equipment, for example, an excimer laser, is required. In addition, if $SiO_2$ film is formed on an inner surface of the nozzle plate, the diameter of the nozzle becomes extremely narrow and the $SiO_2$ film cannot be formed uniformly. In addition, because an additional coating process for depositing coating substance onto an outer surface of the nozzle plate is required, the overall process becomes extremely complicated.

To overcome this problem, an electroforming method which eliminates the additional coating process and requires a low investment cost facility can be employed. However, in this case, due to a limitation imposed by the electrolyte, the roughness of the inner surface cannot exceed 0.016 $\mu$m to 0.025 $\mu$m, and a desirable surface tension cannot be obtained.

SUMMARY OF THE INVENTION

It is therefore an object of the present invention to provide an improved nozzle plate for a micro-injection device.

It is a further object of the invention to provide a nozzle plate which prevents ink from cohering at the inner surface of the nozzle plate.

It is a yet further object of the invention to provide a nozzle plate which prevents crosstalk between nozzles on the outer surface of the plate.

It is a still further object of the invention to provide a nozzle plate which prevents formation of an air bubble which would cut off the supply of ink.

It is also an object of the present invention to provide an improved method for manufacturing the nozzle plate of a micro-injection device.

It is an additional object to provide a less complicated method for manufacturing the nozzle plate of a micro-injection device which produces different surface tensions on the inner and outer sides of the nozzle plate.

It is a yet additional object to provide a less expensive method for manufacturing the nozzle plate of a micro-injection device.

To accomplish the above objects of the present invention, a master plate which defines a nozzle region is dipped into an electrolyte in which $NiH_2/SO_3/H$, $NiCl_2$, $H_3BO_3$, $C_{12}H_{25}SO_4/NaS$ and deionized water are mixed at a predetermined ratio. Then, a predetermined current density is sequentially applied several times, to thereby coat a nozzle plate having a plurality of nozzles onto a surface of the master plate.

Here, the surface of the master plate is polished by heat-treatment and surface-treating processes. Thus, the outer surface of the nozzle plate which contacts a surface of the master plate maintains extremely low roughness. In addition, the inner surface of the finally formed nozzle plate is formed rough by performing ionization on electrolyte formed of $NiH_2/SO_3/H$, $NiCl_2$, $H_3BO_3$, and sodium lauryl sulfate ($C_{12}H_{25}SO_4/NaS$), to thereby maintain an extremely high roughness. As a result, the surface tension of the ink which contacts an inner surface becomes smaller than that of the ink which contacts an outer surface.

BRIEF DESCRIPTION OF THE DRAWINGS

A more complete appreciation of the invention, and many of the attendant advantages thereof, will be readily apparent as the invention becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The present invention now will be described more fully with reference to the accompanying drawings, in which preferred embodiments of the invention are shown. As the terms mentioned in the specification are determined based upon the function of the present invention, and they can be changed according to the technician's intention or a usual practice, the terms should be determined considering the overall contents of the specification of the present invention.

Figure 1:
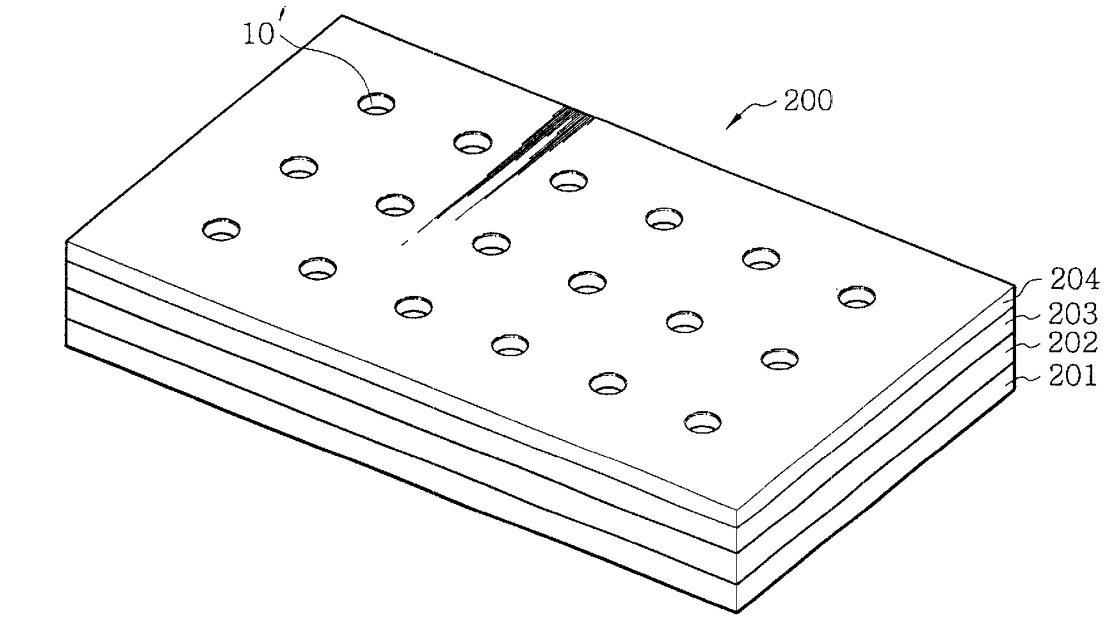
FIGS. 1 to 4 are views showing a process of manufacturing a nozzle plate assembly according to the present invention.

As shown in FIG. 1, a first metal film 203 made preferably of vanadium is formed on a silicon substrate 201 by a chemical vapor deposition method on which a protective film 202 made of $SiO_2$ is formed. At this time, the first metal layer 203 serves to allow a second metal film 204, described below, to be firmly fixed onto the protective film 202.

Then, the second metal layer 204 made preferably of nickel is formed on the first metal layer 203 by a chemical vapor deposition method. Here, the first metal layer 203 for promoting adhesion has been already formed on the protective film 202. Therefore, the second metal layer 204 can be formed more firmly on the protective film 202. The second metal layer 204 is formed on the protective film 202 so that a nozzle plate assembly 1100 which will be formed by a coating method can be easily separated from master plate 200.

Then, a pattern film (not shown) is partially formed on the first and second metal layers 203 and 204, which then are etched using the pattern film as a mask so that the protective film 202 can be partially exposed. Then, the residual pattern film is removed by chemicals, to thereby complete the master plate 200 for defining a nozzle region 110'.

Then, the surface of the second metal layer 204 is degreased by a degreasing liquid, and the master plate 200 is taken into a heating tank and heat-treated at a temperature of preferably 32° C. to 37° C. for 10 to 14 minutes. When this heat-treatment is finished, the master plate 200 is dipped into chemical passivation liquid so as to perform a process on the surface. Accordingly, the surface of the second metal film 204 that forms the leftmost side surface of the master plate 200 is polished to have a low roughness. Preferably, the treatment on the surface of the master plate 200 is performed at a temperature of 22° C. to 27° C. for 10 to 20 seconds.

Subsequently, if the master plate 200 is ready to assist a formation of the nozzle plate assembly 100 of the present invention, the master plate 200 is dipped into electrolyte in which $NiH_2/SO_3/H$, $NiCl_2$, $H_3BO_3$, sodium lauryl sulfate ($C_{12}H_{25}SO_4/NaS$) and deionized water are mixed at a predetermined ratio. Thus, the nozzle plate 8 of the present invention is coated onto a surface of the master plate 200.

Preferably, the electrolyte is made up of 280 g/l to 320 g/l of $NiH_2/SO_3/H$, 18 g/l to 22 g/l of $NiCl_2$, 28 g/l to 32 g/l of $H_3BO_3$ and 0.03 g/l to 0.08 g/l of $C_{12}H_{25}SO_4/NaS$, and more preferably, 300 g/l of $NiH_2/SO_3/H$, 20 g/l of $NiCl_2$, 30 g/l of $H_3BO_3$, 0.05 g/l of $C_{12}H_{25}SO_4/NaS$. Here, in the electrolyte into which the master plate 200 is dipped, a target substance for coating the nozzle plate 8, for example, nickel, is present.

Subsequently, the target substance and the master plate 200 are connected to an external power source. Here, the target substance is connected to "+", while the master plate 200 is connected to "−".

Then, the power source is turned on so as to apply current having predetermined density between the target substance and the master plate 200 several times, sequentially. Preferably, the current is applied for 40 to 60 minutes at a density of 0.1 A/$m^2$, then 25 to 35 minutes at a density of 0.2 A/$m^2$, 18 to 22 minutes at a density of 0.3 A/$m^2$, 18 to 22 minutes at a density of 0.4 A/$m^2$, and 8 to 12 minutes at a density of 0.1 A/$m^2$. More preferably, the current is applied for 60 minutes at a density of 0.1 A/$m^2$, 30 minutes at a density of 0.2 A/$^2$, 20 minutes at a density of 0.3 A/$m^2$, 20 minutes at a density of 0.4 A/$m^2$, and for 10 minutes at a density of 0.1 A/$m^2$.

Figure 2:
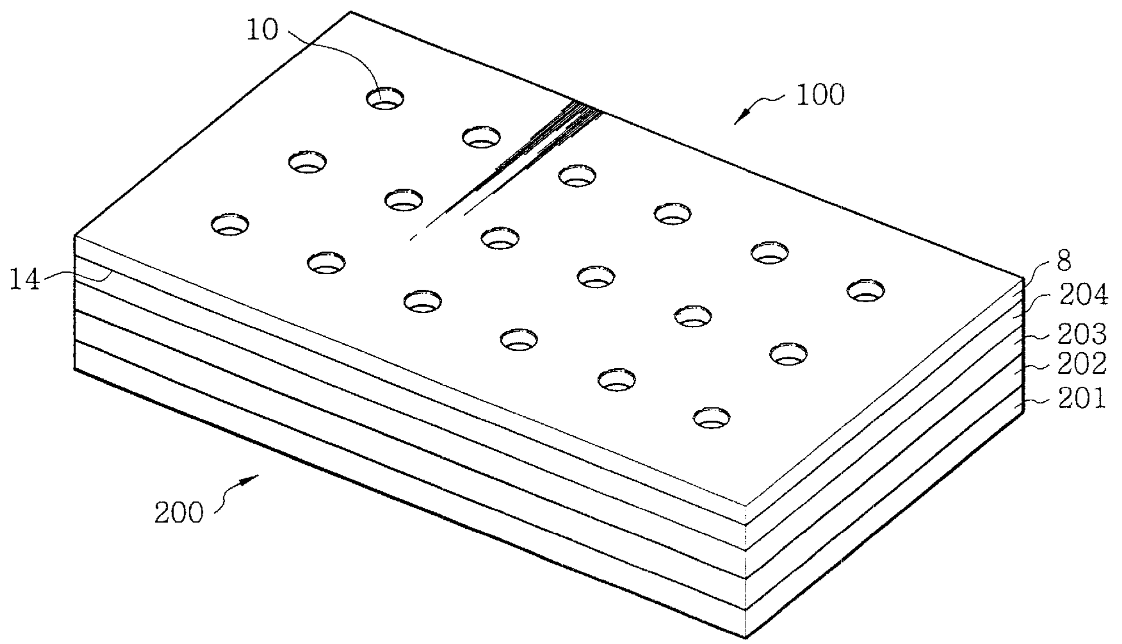

When the current-applying process is performed, the target substance connected to "+" is dissolved and rapidly ionized, and the ionized target substance migrates through the electrolyte as a medium and deposits on the master plate 200 connected to "−", to thereby form the nozzle plate 8 made of nickel on the master plate 200, as shown in FIG. 2. The nozzle plate 8 is coated gradually filling the nozzle region 10' of the master plate 200. When, this process is finished, an inner surface 13 of the nozzle plate 8 is provided with an extremely high roughness.

Meanwhile, the thickness of the nozzle plate 8 being coated can be determinedn by the following equation.

$$\delta = \frac{(P_1 - P_2) \times 10^4}{S} \times \gamma$$

Where δ is a thickness of the nozzle plate, $P_1$ is the weight of the master plate after the nozzle plate is coated,n $P_2$ is the weight of the master plate before the nozzle plate is coated, S is the coated area ofn the nozzle plate, and γ is the specific gravity of the nozzle plate.

By substituting relevant values into the above equation, the thickness of the nozzle plate 8 for an actual product can be determined and adjusted. Preferably, the coating thickness of the nozzle plate 8 is in the range of approximately 15 μm to 25 μm.

When a nozzle plate 8 having the desired thickness is completed, a worker turns off the power supply thus completes the coating process of nozzle plate 8. Then, the master plate 200 on which the nozzle plate 8 is coated is taken out from the electrolyte, and is inserted into a glass tank. Then, the nozzle plate 8 is heat-treated. Preferably, the nozzle plate 8 is stabilized by maintaining it at a temperature in the range of approximately 20° C. to 30° C. for a predetermined time. In this manner, the nozzle plate 8 is provided with relevant mechanical strength. Subsequently, the nozzle plate 8 is dipped into deionized water, cleaned for approximately 5 minutes and dried.

The above-described process for forming the nozzle plate 8 of the present invention adapts a general electroforming method. Such electroforming method is simple and is known as a process which does not require high cost equipment and complicated techniques. Therefore, if the nozzle plate is manufactured according to the present invention, the overall yield of the manufacturing process can be significantly improved.

Figure 3:
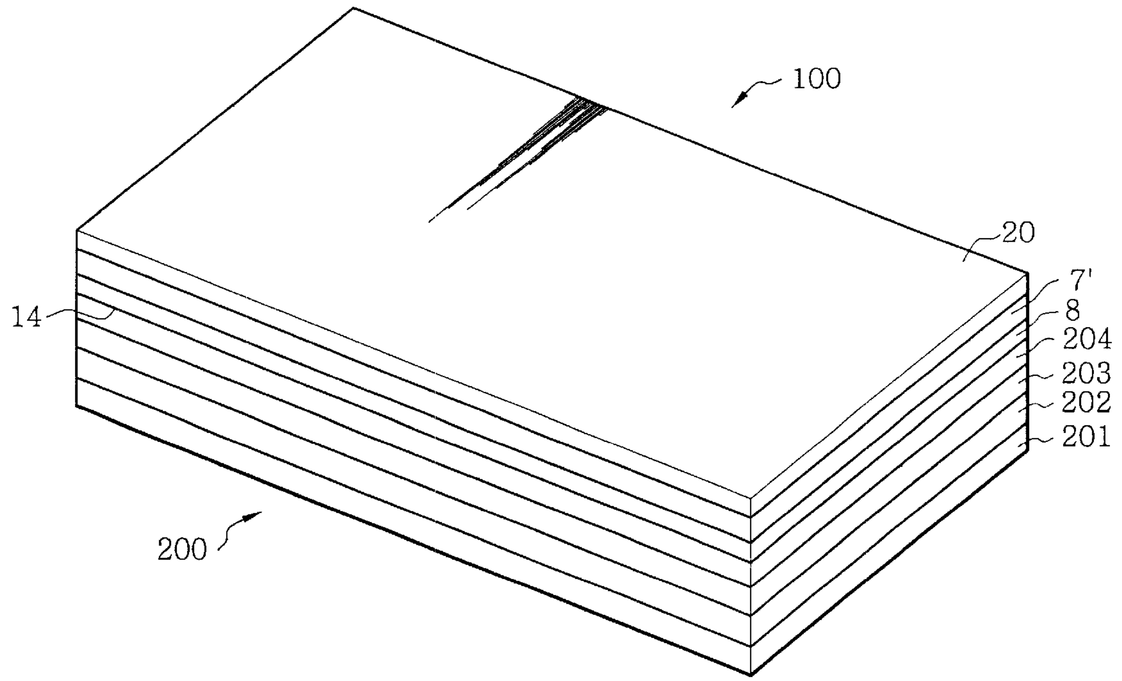

When the above drying process is completed, a process for forming an ink chamber barrier layer 7 on the nozzle plate 8 starts. As shown in FIG. 3, an organic film, for example, a polyimide layer 7', is deposited to a thickness of 30 μm, on the nozzle plate 8. Then, a protection mask layer 20 made of aluminum is deposited to a thickness in the range of approximately 0.8 μm to 1 μm on the polyimide layer 7'.

Subsequently, a photoresist layer (not shown) is deposited on the protection mask layer 20 which then is patterned using the photoresist layer as a mask. Here, because a pattern of the final ink chamber is defined at the photoresist layer, the exact pattern of the ink chamber can be obtained on the protection mask layer 20 when patterning process is completed.

Subsequently, the photoresist layer is removed by chemicals, and the polyimide layer 7' is patterned using the patterned protection mask layer 20 as a mask. Here, as described above, because the exact pattern of the ink chamber has been already obtained on the protection mask layer 20, the polyimide layer 7' is completed as a final ink chamber barrier layer including an ink chamber region, when the patterning process is finished.

Figure 4:
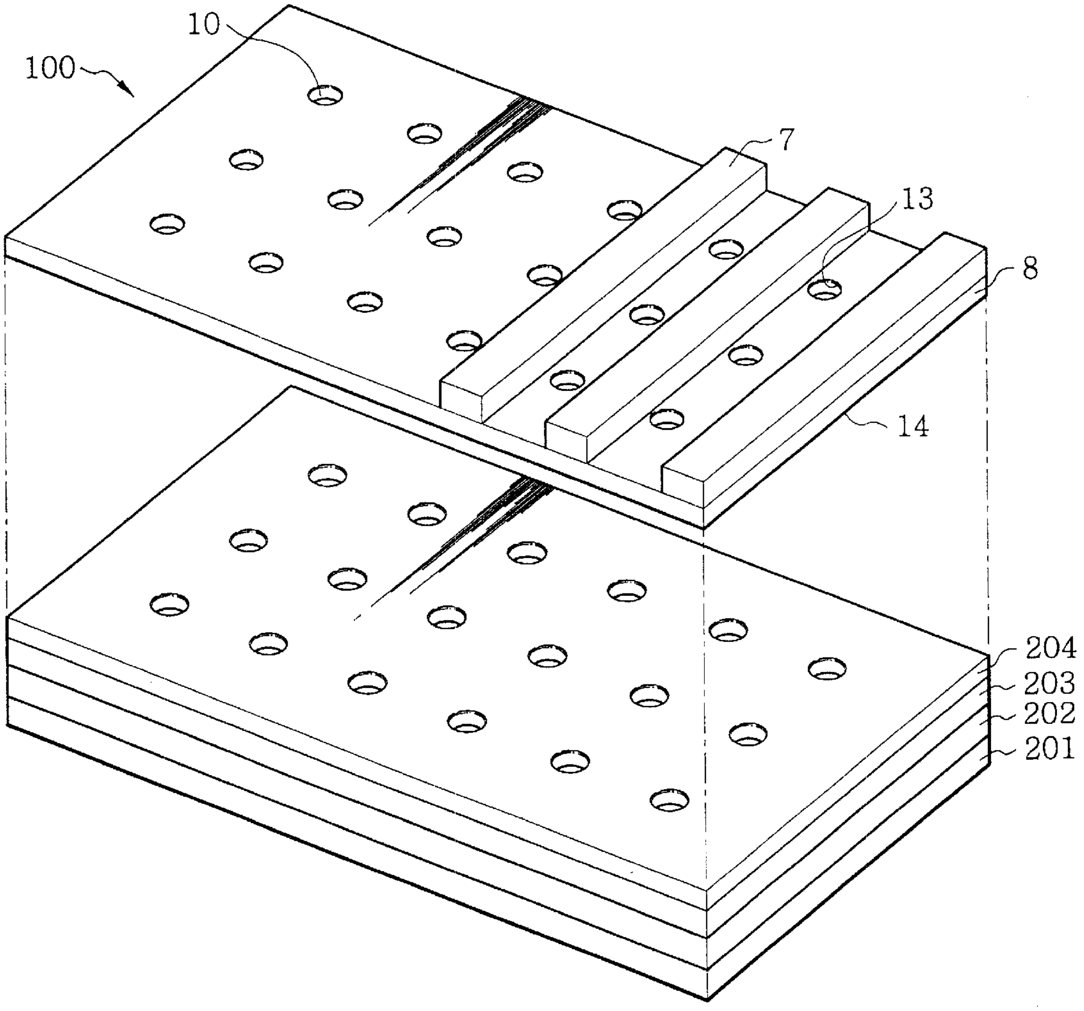

As shown in FIG. 4, the protection mask layer is removed by chemicals, and the nozzle plate 8 combined with the ink chamber barrier layer 7 for defining the ink chamber 9 is separated from the master plate 200 using chemicals, for example, hydrogen fluoride. When the separating process is finished, the nozzle plate assembly 100 in which a plurality of nozzles for ink injection are formed is completed. Here, the nozzles 10 penetrate through the inner surface 13 of the nozzle plate 8 and are thus exposed toward the outer surface 14.

As described above, the surface of the master plate 200 is polished through heat-treatment and surface-treating processes. Therefore, the outer surface 14 of the nozzle plate 8 which contacts surface of the master plate 200 and is finally separated by the above-described separation process can maintain extremely low roughness, preferably in the range of approximately 0.008 μm to 0.016 μm. The inner surface 13 of the finally formed nozzle plate 8 is formed rough by using an electrolyte having $NiH_2/SO_3/H$, $NiCl_2$, $H_3BO_3$, $C_{12}H_{25}SO_4/NaS$, to thereby maintain extremely high roughness, preferably in the range of approximately 1.0 μm to 1.5 μm.

Figure 5:
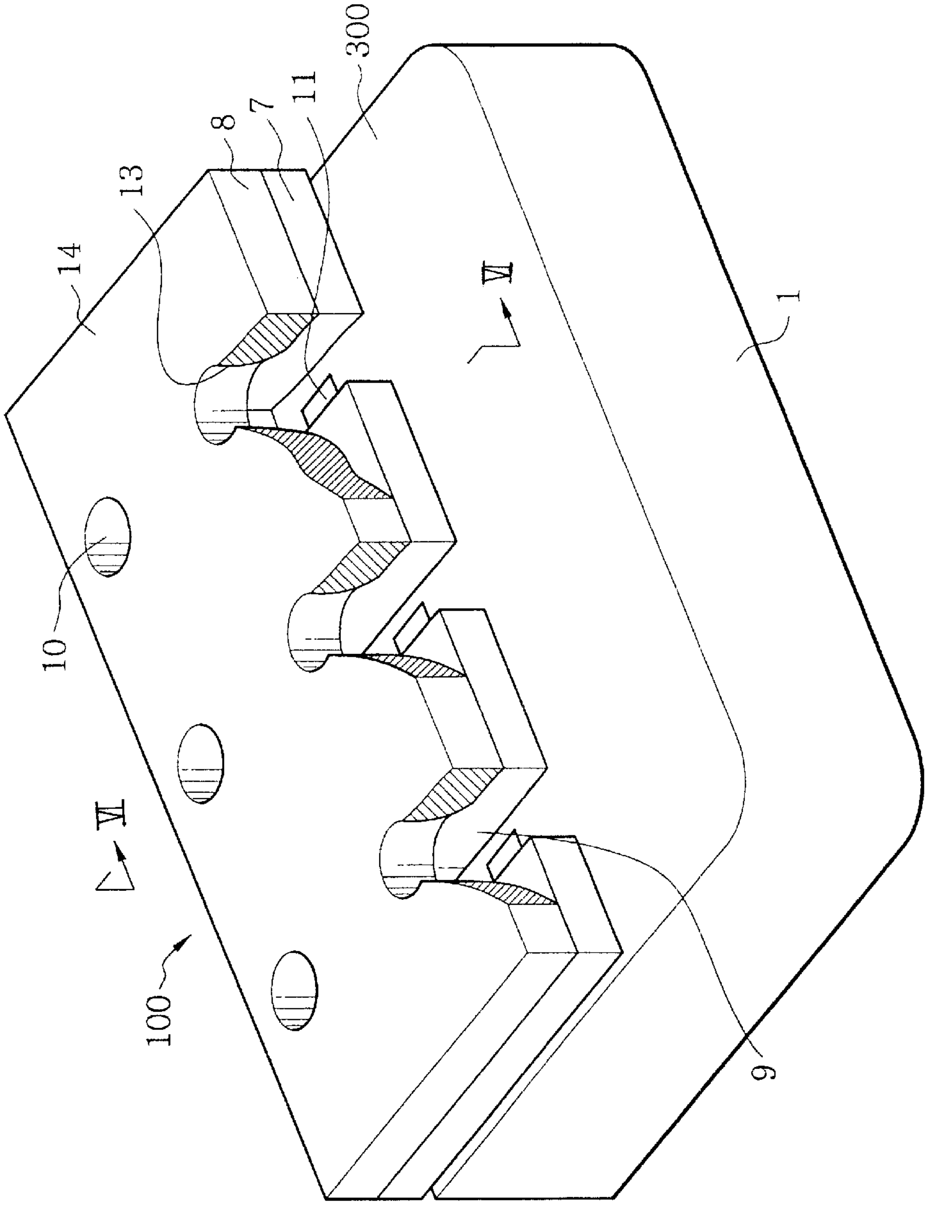
FIG. 5 illustrates an embodiment of a nozzle plate assembly according to the present invention.

As shown in FIG. 5, the nozzle plate assembly 100 including the ink chamber barrier layer 7 which defines the ink chamber 9 disposed on substrate 1 is positioned to face printing paper, to thereby complete the structure of an inkjet printhead. Here, an ink feed channel 300 for defining the feed path of ink is formed adjacent to the ink chamber 9, and the ink fed from an external device flows through the ink feed channel 300. Thus, the ink chamber 9 is filled with the ink.

Figure 6:
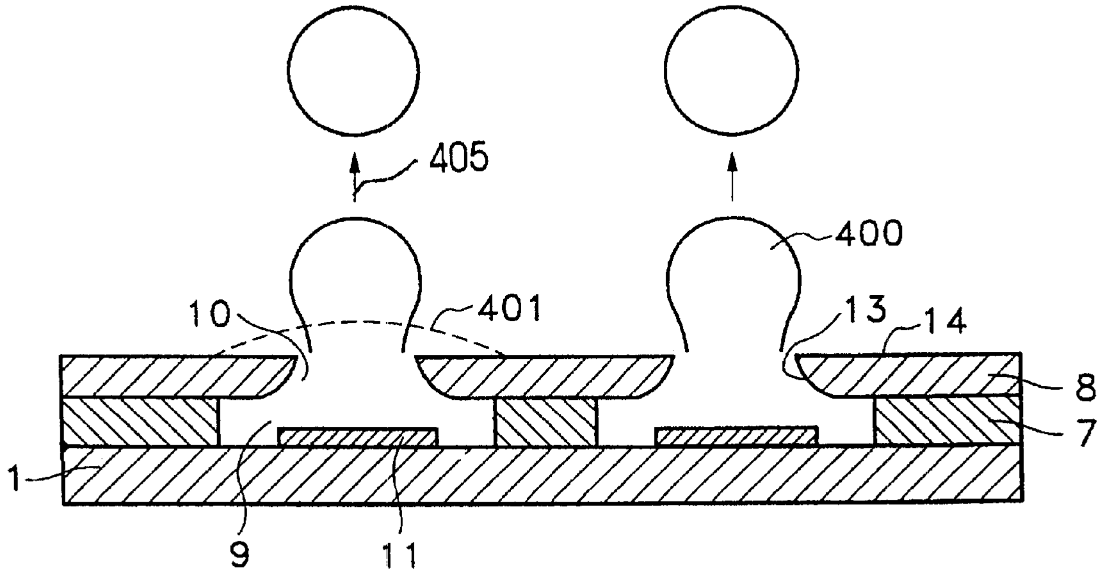
FIG. 6 is a cross-sectional view taken through VI—VI in FIG. 5, showing an operation of a nozzle plate assembly according to the present invention.

Now, the operation of the inkjet printhead employing the nozzle plate assembly 100 of the present invention will be explained. As shown in FIG. 6, if an electric signal is applied to an electrode layer (not shown) from an external power source, a heater 11 connected to the electrode layer is fed with the electric energy and is rapidly heated to a high temperature of 500° C. or higher. During this process, the electric energy is converted into a thermal energy of 500° C. to 550° C.

The thermal energy is then transmitted to the ink chamber 9 which contacts the heater 11, and an ink 400 that fills the ink chamber 9 is rapidly heated and transformed into bubbles. Here, if the thermal energy is continuously transmitted to the ink chamber 9, the bubbled ink 400 is rapidly transformed in volume and expanded. Thus, the bubbled ink 400 is expelled out through the nozzle 10 of the nozzle plate 8 and ready to be ejected. The ink 400 is transformed into oval and circular shapes in turn due to its own weight, and ejected onto printing paper as shown in arrow 405, to thereby perform rapid printing.

As described above, the inner surface 13 of the nozzle plate 8 is formed rough employing electrolyte made up of $NiH_2/SO_3/H$, $NiCl_2$, $H_3BO_3$, $C_{12}H_{25}SO_4/NaS$, to thereby maintain a high roughness of 1.0 μm to 1.5 μm. Thus, the surface tension between the inner surface 13 of the nozzle plate 8 and the ink 400 can be significantly reduced. Thus, the ink 400 can be prevented from cohering. Then, the ink can be smoothly fed from the ink feed channel 300 into the ink chamber 9. In addition, the ink chamber 9 can be fed with sufficient amount of ink, thereby preventing formation of air bubbles.

Meanwhile, the outer surface 14 of the nozzle plate 8 contacts a surface of the polished master plate 200 and is finally separated from the surface, to thereby maintain low roughness in the range of approximately 0.008 μm to 0.016 μm. In addition, surface tension with the ink 400 can be greatly increased. As a result, the crosstalk problem where the ink 400 spreads as indicated in line 401 of FIG. 6 and flows toward an adjacent nozzle can be avoided.

In the prior art, to rectify the problems such as crosstalk or generation of air bubbles, a process for forming a film by employing high cost equipment is required and thus the overall yield is lowered. However, in the present invention, the nozzle plate 8 of which inner surface 13 and outer surface 14 have different roughnesses is formed by adapting a low cost electroforming method. Therefore, the above-mentioned problems such as crosstalk or generation of air bubbles can be rectified without the need for a complicated process, for example, a process for forming a film.

Meanwhile, at the state where the ink 400 is ejected, if the electric signal applied from an external device is temporarily cut off, the heater 11 rapidly cools down. Then, the bubbled ink 400 which remains in the ink chamber 9 rapidly contracts and generates a restoring force restoring the ink to the original form. The thus-generated restoring force rapidly lowers the pressure in the ink chamber 9. Thus, ink which flows through the ink feed channel 300 can rapidly refill the ink chamber 9. Then, the inkjet printhead repeats the above-described ink injection and refill processes driven by electric signals, to thereby perform a print job on printing paper.

As described above, in the present invention, a nozzle plate is formed to have different roughnesses at inner and outer surfaces by employing a low cost electroforming method. Thus, the overall yield of the manufacturing process is improved and such problems as crosstalk and generation of air bubbles can be rectified.

Although it is explained in this specification in the example of an inkjet printhead, the present invention can be adapted to a micro-pump of a medical appliance or a fuel injecting device. This invention has been described above with reference to the aforementioned embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. An assembly in the manufacture of a nozzle plate of a micro-injecting device, comprising:

a substrate;

a protective film formed on the substrate;

a vanadium film formed by chemical vapor deposition on the protective film;

a nickel film formed by chemical vapor deposition on the vanadium film; and a nozzle plate of nickel of a thickness in a range of from approximately 15 to 25 μm electroformed on the nickel film, the nozzle plate including an inner surface of a roughness in a range of from approximately 1.0 to 1.5 μm and the nozzle plate including an outer surface of a roughness in a range of from 0.008 to 0.016 μm.

2. The assembly of claim 1, further comprising:

said nozzle plate being electroformed in an electrolyte solution comprising $NiH_2/SO_3/H$, $NiCl_2$, $H_3BO_3$ and $C_{12}H_{25}SO_4/NaS$.

3. A nozzle plate assembly of a micro-injecting device, comprising:

a plate of nickel of a thickness in a range of from approximately 15 to 25 μm, said plate including a nozzle region formed in the plate, said plate including as outer surface of a roughness in a range of approximately 0.008 to 0.016 μm and said plate including an inner surface of a roughness in a range of approximately 1.0 to 1.5 μm, and said nozzle plate being made by electroforming in an electrolyte solution comprising $NiH_2/SO_3/H$, $NiCl_2$, $H_3BO_3$ and $C_{12}H_{25}SO_4/NaS$.

4. The nozzle plate assembly of claim 3, further comprising an ink chamber barrier layer formed on said plate.

5. The nozzle plate assembly of claim 4, further comprised of the roughness of the outer surface of the plate being a root-mean-square roughness and the roughness of the inner surface of the plate being a root-mean-square roughness.

6. The nozzle plate assembly of claim 3, further comprised of the roughness of the outer surface of the plate being a root-mean-square roughness and the roughness of the inner surface of the plate being a root-mean-square roughness.

7. The assembly of claim 1, further comprised of the roughness of the outer surface of the nozzle plate being a root-mean-square roughness and the roughness of the inner surface of the nozzle plate being a root-mean-square roughness.

8. The assembly of claim 2, further comprised of the roughness of the outer surface of the nozzle plate being a root-mean-square roughness and the roughness of the inner surface of the nozzle plate being a root-mean-square roughness.

9. An assembly in the manufacture of a nozzle plate of a micro-injecting device, comprising:

a substrate;

a protective film formed on the substrate;

a vanadium film formed by chemical vapor deposition on the protective film;

a nickel film formed by chemical vapor deposition on the vanadium film; and nozzle plate of nickel electroformed on the nickel film, with an outer surface of the nozzle plate being of a low roughness relative to a roughness of an inner surface of the nozzle plate.

10. The assembly of claim 9, further comprising:

said nozzle plate being electroformed in an electrolyte solution comprising $NiH_2/SO_3/H$, $NiCl_2$, $H_3BO_3$ and $C_{12}H_{25}SO_4/NaS$.

11. A micro ejecting device, comprising:

a nozzle plate of nickel, said plate including a nozzle region formed in the plate, said plate including an outer surface of a low roughness relative to a roughness of an inner surface of the plate, said inner surface comprising an inner sidewall of a nozzle hole perforating said nozzle plate.

12. The micro ejecting device of claim 11, further comprising an ink chamber barrier layer formed on said plate.

13. An assembly in the manufacture of a nozzle plate of a micro-injecting device, comprising:

a substrate;

a protective film formed on the substrate;

a first metal film formed by chemical vapor deposition on the protective film;

a second metal film formed by chemical vapor deposition on the first metal film; and a nozzle plate electroformed on the second metal film, with an outer surface of the nozzle plate being of a low roughness relative to a roughness of an inner surface of the nozzle plate.

14. The assembly of claim 13, further comprising:

said nozzle plate being electroformed in an electrolyte solution comprising $NiH_2/SO_3/H$, $NiCl_2$, $H_3BO_3$ and $C_{12}H_{25}SO_4/NaS$.

15. A nozzle plate assembly of a micro-injecting device, comprising:

a plate, said plate including a nozzle region formed in the plate, said plate including an outer surface of a low roughness relative to a roughness of an inner surface of the plate.

16. The nozzle plate assembly of claim 15, further comprising an ink chamber barrier layer formed on said plate.

17. The micro ejecting device of claim 11, said inner surface of said nozzle plate comprising only said inner sidewall of a nozzle hole perforating said nozzle plate.

18. The micro ejecting device of claim 12, said nozzle plate comprising a bottom surface opposite said outer surface, said bottom surface being attached to said ink chamber barrier layer, said bottom surface being mutually exclusive from said inner surface of said nozzle plate.

19. The nozzle plate assembly of claim 15, said nozzle plate being perforated by a plurality of nozzle holes, each nozzle hole having a sidewall defining said nozzle hole, said inner surface comprising said sidewall of each nozzle hole.

20. The nozzle plate assembly of claim 19, said nozzle plate comprising a bottom surface opposite to said outer surface, said inner surface being mutually exclusive from said bottom surface, said inner surface being disposed between said outer surface and said bottom surface.

21. The micro ejecting device of claim 11, said inner surface of said nozzle plate having a root-mean-square roughness of 1.0 to 1.5 $\mu$m and said outer surface having a root-mean square roughness of 8 to 16 nm.

22. The micro ejecting device of claim 18, said inner surface of said nozzle plate having a root-mean-square roughness of 1.0 to 1.5 $\mu$m and said outer surface having a root-mean square roughness of 8 to 16 nm.

23. The nozzle plate assembly of claim 15, said inner surface of said nozzle plate having a root-mean-square roughness of 1.0 to 1.5 $\mu$m and said outer surface having a root-mean square roughness of 8 to 16 nm.

24. The nozzle plate assembly of claim 20, said inner surface of said nozzle plate having a root-mean-square roughness of 1.0 to 1.5 $\mu$m and said outer surface having a root-mean square roughness of 8 to 16 nm.

* * * * *